US012749396B2

(12) United States Patent
Chiba et al.

(10) Patent No.: US 12,749,396 B2
(45) Date of Patent: Sep. 29, 2026

(54) VEHICLE CONTROL SYSTEM AND VEHICLE CONTROL METHOD

(71) Applicant: TOYOTA JIDOSHA KABUSHIKI KAISHA, Aichi-ken (JP)

(72) Inventors: Hiroya Chiba, Fuji (JP); Yuhei Oka, Susono (JP); Daisuke Kakuma, Susono (JP); Kento Iwahori, Nagoya (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 182 days.

(21) Appl. No.: 18/642,822

(22) Filed: Apr. 23, 2024

(65) Prior Publication Data

US 2024/0404403 A1 Dec. 5, 2024

(30) Foreign Application Priority Data

May 31, 2023 (JP) ................................ 2023-090363

(51) Int. Cl.

| | |
|---|---|
| ***G08G 1/00*** | (2006.01) |
| ***G06V 20/52*** | (2022.01) |
| ***G08G 1/01*** | (2006.01) |
| ***G08G 1/056*** | (2006.01) |
| ***G08G 1/0967*** | (2006.01) |

(52) U.S. Cl.

CPC ....... *G08G 1/096725* (2013.01); *G06V 20/52* (2022.01); *G08G 1/0116* (2013.01); *G08G 1/056* (2013.01); *G08G 1/096783* (2013.01); *G06V 2201/07* (2022.01); *G06V 2201/08* (2022.01)

(58) Field of Classification Search

CPC ........... G08G 1/096725; G08G 1/0116; G08G 1/056; G08G 1/096783; G08G 1/00; G06V 20/52; G06V 2201/07; G06V 2201/08; G06V 20/58; B60W 30/0956; B60W 30/09; B60W 2420/403; B60W 2556/45

USPC .......................................................... 701/117

See application file for complete search history.

(56) References Cited

U.S. PATENT DOCUMENTS

2015/0307093 A1* 10/2015 Sasabuchi ............. B60W 10/18 701/1
2017/0277184 A1 9/2017 Fujimura et al.
2021/0300349 A1* 9/2021 Hara ................. B60W 30/0956
2022/0080958 A1* 3/2022 Song .................... G06V 10/147

(Continued)

FOREIGN PATENT DOCUMENTS

EP 1470967 A1 10/2004
JP 2003-285705 A 10/2003

(Continued)

*Primary Examiner* — Shardul D Patel

(74) *Attorney, Agent, or Firm* — HAUPTMAN HAM, LLP

(57) ABSTRACT

A vehicle control system for controlling a vehicle traveling in a predetermined area is provided. The vehicle control system acquires vehicle information indicating a position of the vehicle. The vehicle control system sets a determination region around the vehicle based on the vehicle information. The vehicle control system acquires an image captured by an infrastructure camera that is installed outside the vehicle and images a situation of the predetermined area. The vehicle control system determines whether or not a target is present in the determination region based on the image captured by the infrastructure camera. The vehicle control system decelerates the vehicle when the target is present in the determination region.

18 Claims, 13 Drawing Sheets

(56) References Cited

U.S. PATENT DOCUMENTS

| | | | | |
|---|---|---|---|---|
| 2022/0111823 | A1* | 4/2022 | Kim | B60T 7/22 |
| 2022/0276655 | A1 | 9/2022 | Takahashi et al. | |
| 2023/0227028 | A1* | 7/2023 | Furuya | B60W 30/095<br>701/301 |
| 2023/0267837 | A1 | 8/2023 | Ishigooka et al. | |
| 2023/0303066 | A1* | 9/2023 | Noguchi | B60W 30/0956 |
| 2023/0311927 | A1* | 10/2023 | Kadowaki | B60W 50/16<br>340/425.5 |

FOREIGN PATENT DOCUMENTS

| | | | |
|---|---|---|---|
| JP | 2015-210572 | A | 11/2015 |
| JP | 2017171273 | A | 9/2017 |
| JP | 2021-062759 | A | 4/2021 |
| JP | 2021-160477 | A | 10/2021 |
| JP | 2022051150 | A | 3/2022 |
| WO | 2021033574 | A1 | 2/2021 |

* cited by examiner

10: IN-VEHICLE SYSTEM

100: VEHICLE CONTROL SYSTEM

VEHICLE CONTROL SYSTEM AND VEHICLE CONTROL METHOD

CROSS-REFERENCES TO RELATED APPLICATION

The present disclosure claims priority to Japanese Patent Application No. 2023-090363, filed on May 31, 2023, the contents of which application are incorporated herein by reference in their entirety.

TECHNICAL FIELD

The present disclosure relates to a technique for controlling a vehicle traveling in a predetermined area.

BACKGROUND ART

Patent Literature 1 discloses a driving assistance device for a vehicle. The driving assistance device sets a determination region for collision risk determination in front of the vehicle. The driving assistance device detects a preceding vehicle ahead of the vehicle using an in-vehicle camera. When the preceding vehicle enters the determination region, the driving assistance device determines that there is a collision risk and issues a warning to an occupant.

List of Related Art

Patent Literature 1: Japanese Laid-Open Patent Application No. JP-2021-062759

SUMMARY

According to the technique described in Patent Literature 1, it is only a target viewable by the in-vehicle camera that is treated as a target for the collision risk determination. For example, since a target ahead of a curve in front of the vehicle is not viewable by the in-vehicle camera, it is not possible to determine a collision risk with regard to the target. When the target comes into a field of vision of the in-vehicle camera after the vehicle comes very close to the target, sudden braking may be caused.

An object of the present disclosure is to provide a technique capable of improving safety when controlling a vehicle traveling in a predetermined area.

A first aspect is directed to a vehicle control system for controlling a vehicle traveling in a predetermined area.

The vehicle control system includes one or more processors.

The one or more processors acquire vehicle information indicating a position of the vehicle.

The one or more processors set a determination region around the vehicle based on the vehicle information.

The one or more processors acquire an image captured by an infrastructure camera that is installed outside the vehicle and images a situation of the predetermined area.

The one or more processors determine whether or not a target is present in the determination region based on the image captured by the infrastructure camera.

The one or more processors decelerate the vehicle when the target is present in the determination region.

A second aspect is directed to a vehicle control method for controlling a vehicle in a predetermined area by a computer.

The vehicle control method includes:

acquiring vehicle information indicating a position of the vehicle;

setting a determination region around the vehicle based on the vehicle information;

acquiring an image captured by an infrastructure camera that is installed outside the vehicle and images a situation of the predetermined area;

determining whether or not a target is present in the determination region based on the image captured by the infrastructure camera; and decelerating the vehicle when the target is present in the determination region.

According to the present disclosure, the infrastructure camera is used for controlling the vehicle. Using the infrastructure camera makes it possible to detect a target that cannot be detected by an in-vehicle sensor such as an in-vehicle camera. Then, the vehicle control is performed in consideration of the target that cannot be detected by the in-vehicle sensor. More specifically, when the target is present in the determination region around the vehicle, the vehicle is decelerated. Since the target that cannot be detected by the in-vehicle sensor is taken into consideration as well, it is possible to decelerate the vehicle well in advance, which can reduce necessity of sudden braking. Therefore, the safety in controlling the vehicle is improved.

DETAILED DESCRIPTION

Embodiments of the present disclosure will be described with reference to the accompanying drawings.

1. FIRST EMBODIMENT

1-1. Overview

Figure 1:
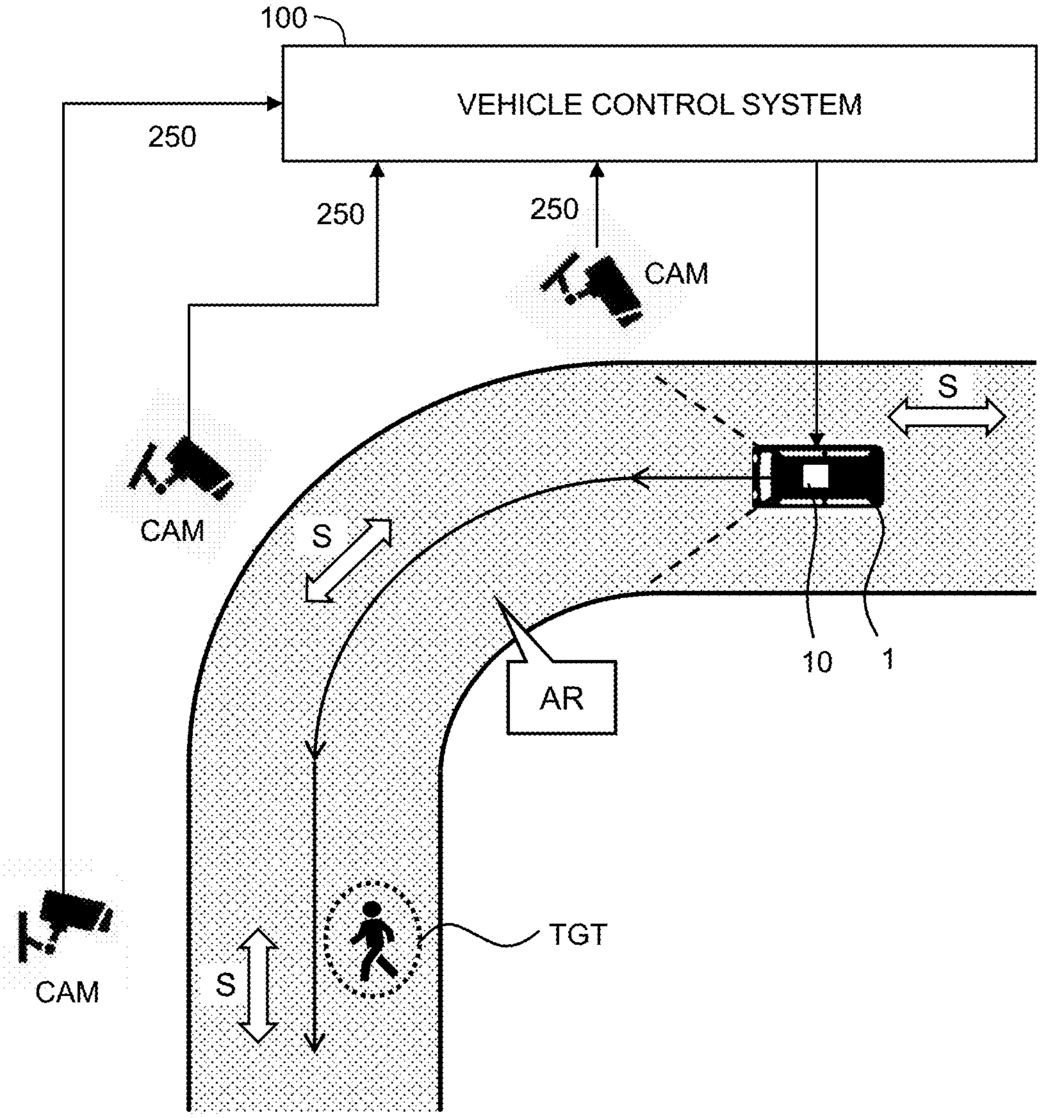
FIG. 1 is a conceptual diagram for explaining an overview of a vehicle control system according to a first embodiment.

FIG. 1 is a conceptual diagram for explaining an overview of a vehicle control system 100 according to the first embodiment. The vehicle control system 100 controls a vehicle 1 traveling in a predetermined area AR.

The predetermined area AR in which the vehicle 1 travels is, for example, an elongated region extending in a first direction S. It can be said that the first direction S is a longitudinal direction of the predetermined area AR. Examples of the predetermined area AR include a roadway (e.g., expressway, general road), a passage in a parking lot, a passage in a factory, and the like. A center line of the predetermined area AR parallel to the first direction S may be the same as a center line of the roadway or the passage. On the other hand, a width of the predetermined area AR orthogonal to the first direction S does not need to be completely equal to a width of the roadway or the passage. The width of the predetermined area AR may be a width obtained by adding a margin width to a vehicle width of a general vehicle. The width of the predetermined area AR may be increased in a curve section.

The vehicle control system 100 may include at least a part of an in-vehicle system 10 installed on the vehicle 1. The in-vehicle system 10 acquires a current position of the vehicle 1 by the use of a global navigation satellite system (GNSS). In addition, the in-vehicle system 10 acquires an image captured (taken) by an in-vehicle camera. The in-vehicle system 10 may control the vehicle 1 based on the image captured by the in-vehicle camera. For example, the in-vehicle system 10 may control automated driving of the vehicle 1 based on the image captured by the in-vehicle camera. That is, the vehicle 1 may be an automated driving vehicle. Here, the automated driving means that at least a part of steering, acceleration, and deceleration of the vehicle 1 is automatically performed independently of a driver's driving operation. As an example, the automated driving may be one of Level 3 or higher.

The vehicle control system 100 may include an external device that is located outside the vehicle 1. For example, the external device is a management server that manages the vehicle 1. The management server may be a distributed server that performs distributed processing. The external device communicates with the vehicle 1 (i.e., the in-vehicle system 10) and remotely controls the vehicle 1.

The vehicle control system 100 may be distributed to the in-vehicle system 10 and the external device.

According to the present embodiment, an "infrastructure camera CAM" installed outside the vehicle 1 is also used for controlling the vehicle 1. The infrastructure camera CAM is installed so as to be able to image a situation of the predetermined area AR and its surroundings. Typically, a plurality of infrastructure cameras CAM are installed along the longitudinal direction (i.e., the first direction S) of the predetermined area AR. Respective angles of view of the plurality of infrastructure cameras CAM may partially overlap each other. An image 250, which is captured (taken) by the infrastructure camera CAM, indicates the situation of the predetermined area AR and its surroundings.

The vehicle control system 100 communicates with the infrastructure camera CAM to acquire the image 250 captured (taken) by the infrastructure camera CAM. A target TGT present in the predetermined area AR may be shown in the image 250. Here, the target TGT is an object other than the vehicle 1 which is the control target. Examples of the target TGT include a pedestrian, a bicycle, another vehicle (for example, a preceding vehicle, a parked vehicle) other than the vehicle 1, and the like.

The vehicle control system 100 is able to detect (recognize) the target TGT present in the predetermined area AR based on the image 250 captured by the infrastructure camera CAM. For example, the vehicle control system 100 utilizes an image recognition AI (Artificial Intelligence) to recognize the target TGT shown in the image 250. The image recognition AI is generated in advance through machine learning. Installation information (an installation position, an installation direction, an angle of view, and the like) of the infrastructure camera CAM is known information. Based on the installation information of the infrastructure camera CAM and an in-image position of the target TGT in the image 250, the vehicle control system 100 is able to detect the target TGT present in the predetermined area AR and further calculate a position of the target TGT in an absolute coordinate system.

By using the infrastructure camera CAM, it may be possible to detect a target TGT that cannot be detected by an in-vehicle sensor such as an in-vehicle camera. In FIG. 1, for example, a target TGT is present in the predetermined area AR ahead of a curve in front of the vehicle 1. The target TGT ahead of the curve in front of the vehicle 1 cannot be detected by the in-vehicle sensor, but can be detected by the infrastructure camera CAM. The same applies to a case where a steep slope exists in front of the vehicle 1.

The target TGT present in the predetermined area AR may be a "risk" for the vehicle 1 traveling in the predetermined area AR. Therefore, the vehicle control system 100 performs "risk avoidance control" for avoiding the risk, as necessary. More specifically, the vehicle control system 100 automatically performs at least one of steering and deceleration of the vehicle 1 in order to avoid a collision between the vehicle 1 and the target TGT. That is, the risk avoidance control includes at least one of steering control and deceleration control.

In the following, in particular, the deceleration control in the risk avoidance control will be described in detail. The steering control may be performed in addition to the deceleration control described below.

Figure 2:
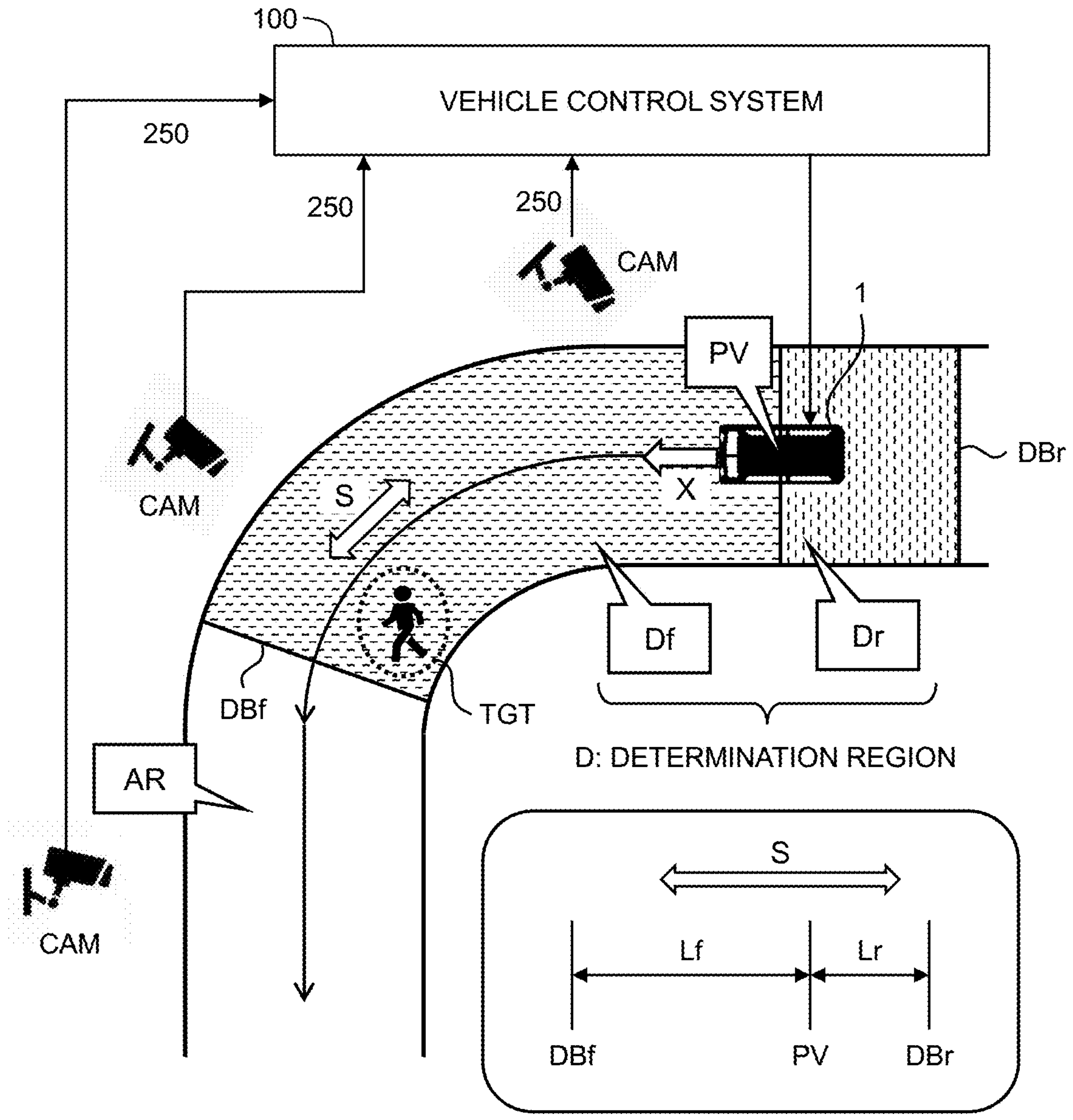
FIG. 2 is a conceptual diagram for explaining an example of a determination region used for risk avoidance control according to the first embodiment.

FIG. 2 is a conceptual diagram for explaining an example of a "determination region D" used for the risk avoidance control. The determination region D is a region for determining whether or not to activate the risk avoidance control. In a case where the target TGT is present in the determination region D, the risk avoidance control (the deceleration control) is activated. As shown in FIG. 2, the determination region D is set around the vehicle 1. Typically, the determination region D is set so as to extend in the first direction S, similarly to the predetermined area AR. A width of the determination region D orthogonal to the first direction S may be equal to the width of the predetermined area AR. Alternatively, the width of the determination region D orthogonal to the first direction S may be slightly larger than the width of the predetermined area AR.

A vehicle position PV is a position of the vehicle 1 in the absolute coordinate system. A direction of travel X is a direction in which the vehicle 1 travels. A "front direction (forward)" is the direction of travel X, and a "rear direction (rearward)" is a direction opposite to the direction of travel X. The determination region D may be divided into a "front determination region Df" and a "rear determination region Dr."

The front determination region Df is the determination region D in front of the vehicle 1 and is located in the front direction (i.e., the direction of travel X) when viewed from the vehicle position PV. A front boundary DBf is a front end of the front determination region Df. It can be said that the front determination region Df is a region between the front boundary DBf and the vehicle position PV. A front distance Lf is a distance from the vehicle position PV to the front boundary DBf along the first direction S. The front distance Lf is set to a distance within which the vehicle 1 is able to stop easily without sudden braking. A position of the front boundary DBf may change in conjunction with the vehicle position PV. In that case, the front determination region Df also changes in conjunction with the vehicle position PV.

On the other hand, the rear determination region Dr is the determination region D behind the vehicle 1 and is located in the rear direction when viewed from the vehicle position PV. A rear boundary DBr is a rear end of the rear determination region Dr. It can be said that the rear determination region Dr is a region between the rear boundary DBr and the vehicle position PV. A rear distance Lr is a distance from the vehicle position PV to the rear boundary DBr along the first direction S. A position of the rear boundary DBr may change in conjunction with the vehicle position PV. In that case, the rear determination region Dr also changes in conjunction with the vehicle position PV.

The vehicle control system 100 sets the determination region D (the front determination region Df and the rear determination region Dr) based on the vehicle position PV. In addition, as described above, the vehicle control system 100 detects the target TGT present in the predetermined area AR based on the image 250 captured by the infrastructure camera CAM. Further, the vehicle control system 100 calculates the position of the target TGT in the absolute coordinate system based on the installation information (the installation position, the installation direction, the angle of view, and the like) of the infrastructure camera CAM. Additionally, the vehicle control system 100 may detect the target TGT around the vehicle 1 by using an in-vehicle sensor such as an in-vehicle camera.

Then, the vehicle control system 100 determines whether or not the target TGT is present in the determination region D. An example of the determination process is as follows. The vehicle control system 100 sets a target region that covers the detected target TGT and the vicinity thereof. For example, the target region has a circular shape. As a size of the target TGT becomes larger, the target region also becomes larger. The target region may become larger as a moving speed of the target TGT becomes higher. The target region may have a shape in which a direction of movement of the target TGT is widened. When the target region and the determination region D at least partially overlap each other, the vehicle control system 100 determines that the target TGT is present in the determination region D.

When the target TGT is present in the determination region D, the vehicle control system 100 activates the risk avoidance control (i.e., the deceleration control). That is to say, when the target TGT is present in the determination region D, the vehicle control system 100 decelerates the vehicle 1. Here, decelerating is a concept including decelerating to stop. That is, the vehicle control system 100 may stop the vehicle 1.

Figure 3:
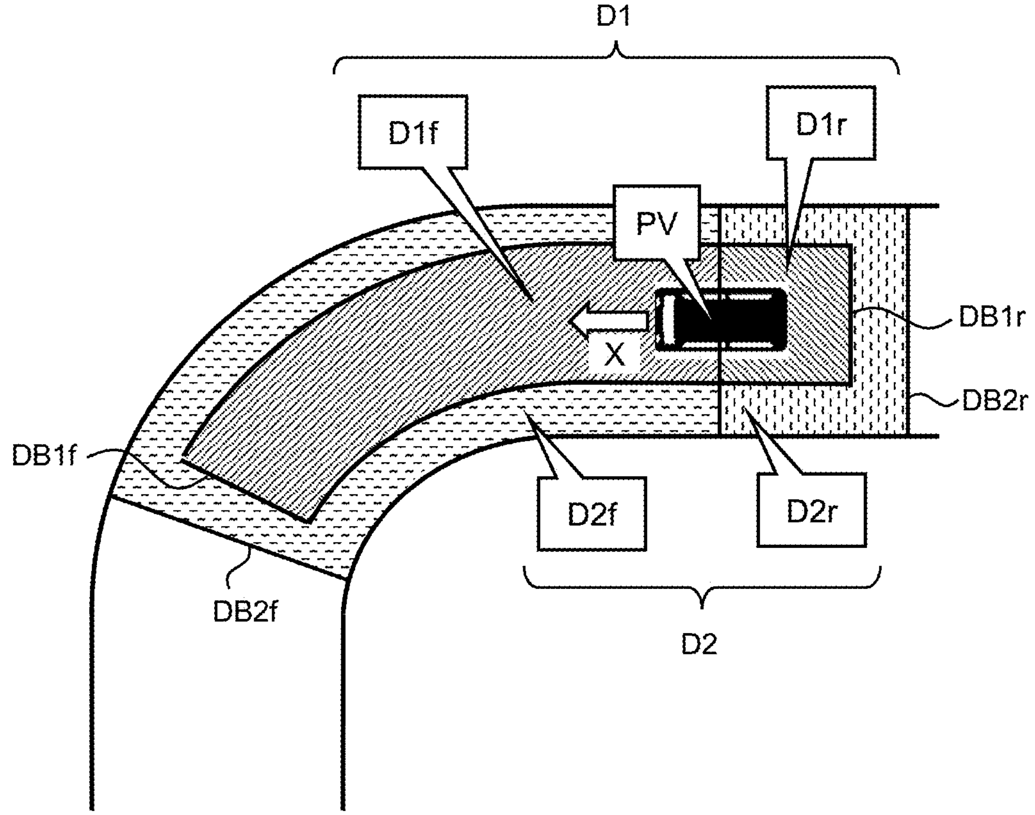
FIG. 3 is a conceptual diagram for explaining another example of the determination region used for the risk avoidance control according to the first embodiment.

FIG. 3 is a conceptual diagram for explaining another example of the determination region D. In the example shown in FIG. 3, the determination region D is divided into a first determination region D1 and a second determination region D2. The first determination region D1 is located on the inner side, and the second determination region D2 is located on the outer side. In other words, the second determination region D2 surrounds the first determination region D1.

The front determination region Df is divided into a first front determination region D1*f* and a second front determination region D2*f*. The first front determination region D1*f* is located on the inner side, and the second front determination region D2*f* is located on the outer side. In other words, the second front determination region D2*f* surrounds the first front determination region D1*f*. A first front boundary DB If is a front end of the first front determination region D1*f*. A second front boundary DB2*f* is a front end of the second front determination region D2*f*.

The rear determination region Dr is divided into a first rear determination region D1*r* and a second rear determination region D2*r*. The first rear determination region D1*r* is located on the inner side, and the second rear determination region D2*r* is located on the outer side. In other words, the second rear determination region D2*r* surrounds the first rear determination region Dlr. A first rear boundary DB1*r* is a rear end of the first rear determination region Dlr. A second rear boundary DB2*r* is a rear end of the second rear determination region D2*r*.

The vehicle control system 100 determines whether or not the target TGT is present in the determination region D. When the target TGT is present in the first determination region D1 on the inner side, the vehicle control system 100 decelerates to stop the vehicle 1. This corresponds to emergency stop control. On the other hand, when the target TGT is present in the second determination region D2 on the outer side, the vehicle control system 100 decelerates the vehicle 1 more slowly than in the case of the emergency stop control. This corresponds to normal deceleration control. A deceleration in the normal deceleration control is lower than a deceleration in the emergency stop control.

As described above, according to the present embodiment, the infrastructure camera CAM is used for controlling the vehicle 1. Using the infrastructure camera CAM makes it possible to detect the target TGT that cannot be detected by an in-vehicle sensor such as an in-vehicle camera. For example, even a target TGT present ahead of a curve in front of the vehicle 1 can be detected by the infrastructure camera CAM. Then, the control of the vehicle 1 is performed in consideration of the target TGT that cannot be detected by the in-vehicle sensor. More specifically, when the target TGT is present in the determination region D around the vehicle 1, the vehicle 1 is decelerated. Since the target TGT that cannot be detected by the in-vehicle sensor is taken into consideration as well, it is possible to decelerate the vehicle 1 well in advance, which can reduce necessity of sudden braking. Therefore, the safety in controlling the vehicle 1 is improved.

1-2. Example of In-Vehicle System

Figure 4:
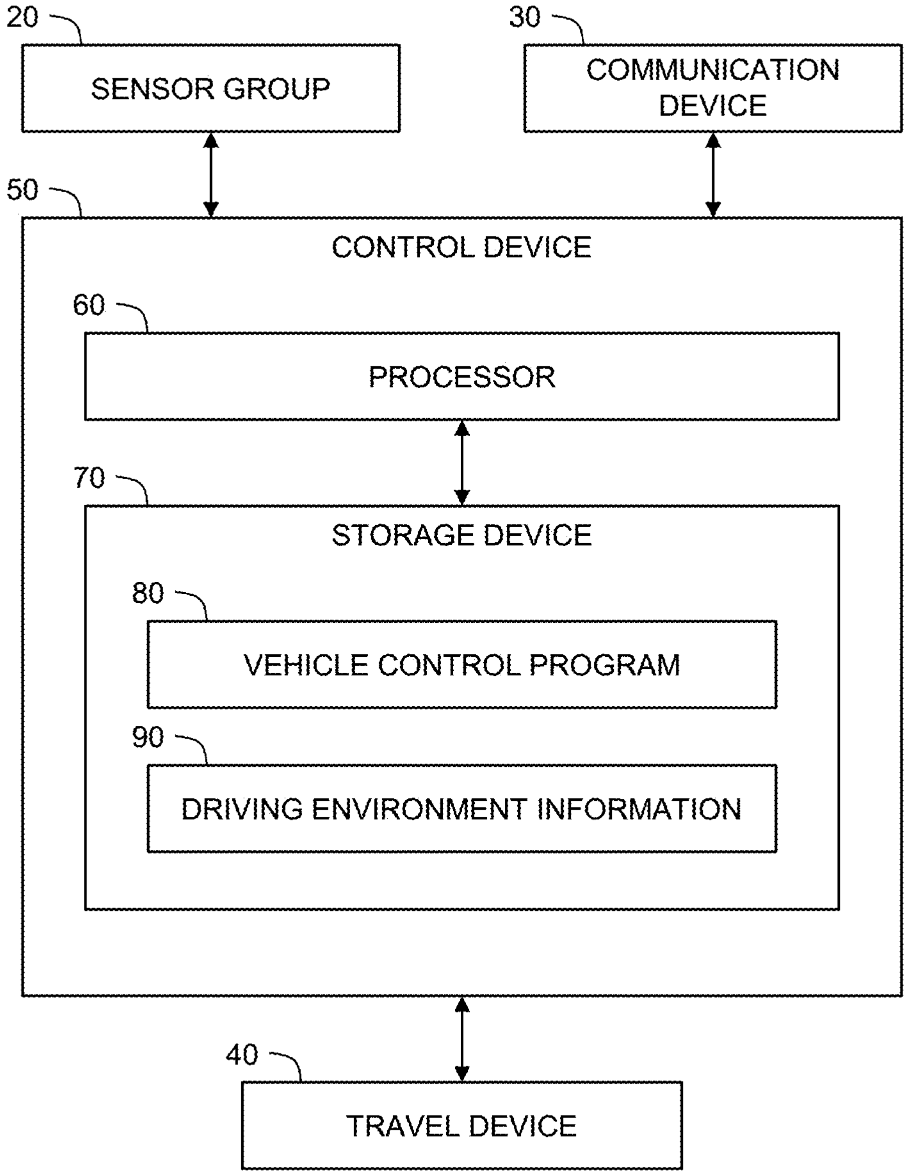
FIG. 4 is a block diagram showing an example of a configuration of an in-vehicle system according to the first embodiment.

FIG. 4 is a block diagram showing an example of a configuration of the in-vehicle system 10 installed on the vehicle 1. The in-vehicle system 10 includes a sensor group 20, a communication device 30, a travel device 40, and a control device 50.

The sensor group 20 includes a recognition sensor, a vehicle state sensor, and a position sensor. The recognition sensor recognizes (detects) a situation around the vehicle 1. Examples of the recognition sensor include a camera, a laser imaging detection and ranging (LIDAR), a radar, and the like. The vehicle state sensor detects a state of the vehicle 1. For example, the vehicle state sensor includes a speed sensor, an acceleration sensor, a yaw rate sensor, a steering angle sensor, and the like. The position sensor detects a position and an orientation of the vehicle 1. For example, the position sensor includes a GNSS sensor.

The communication device 30 communicates with the outside via a communication network. For example, the communication device 30 communicates with the infrastructure camera CAM, the management server, and the like.

The travel device 40 includes a steering device, a driving device, and a braking device. The steering device steers wheels. For example, the steering device includes an electric power steering (EPS) device. The drive device is a power source that generates a driving force. Examples of the drive device include an engine, an electric motor, an in-wheel motor, and the like. The braking device generates a braking force.

The control device (controller) 50 is a computer that controls the vehicle 1. The control device 50 includes one or more processors 60 (hereinafter, simply referred to as a processor 60 or processing circuitry) and one or more storage devices 70 (hereinafter, simply referred to as a storage device 70). The processor 60 executes a variety of processing. Examples of the processor 60 include a central processing unit (CPU), a graphics processing unit (GPU), an application specific integrated circuit (ASIC), a field-programmable gate array (FPGA), and the like. The storage device 70 stores a variety of information. Examples of the storage device 70 include a hard disk drive (HDD), a solid state drive (SSD), a volatile memory, a non-volatile memory, and the like.

A vehicle control program 80 is a computer program for controlling the vehicle 1. The functions of the control device 50 may be implemented by a cooperation of the processor 60 executing the vehicle control program 80 and the storage device 70. The vehicle control program 80 is stored in the storage device 70. Alternatively, the vehicle control program 80 may be recorded on a non-transitory computer-readable recording medium.

The control device 50 acquires driving environment information 90 indicating a driving environment for the vehicle 1. The driving environment information 90 is stored in the storage device 70.

The driving environment information 90 includes surrounding situation information acquired based on the recognition sensor. For example, the surrounding situation information includes an image captured by the camera. As another example, the surrounding situation information may include point group information acquired by the LIDAR. The surrounding situation information includes object information regarding an object (target) around the vehicle 1. Examples of the object around the vehicle 1 include a pedestrian, another vehicle, an obstacle, a white line, a landmark, a traffic light, and the like. The object information indicates a relative position and a relative speed of the object with respect to the vehicle 1.

The driving environment information 90 further includes position information indicating the vehicle position PV (i.e., the current position of the vehicle 1) in the absolute coordinate system. The control device 50 acquires the position information from a result of detection by the position sensor. The control device 50 may acquire highly accurate position information by commonly-known localization processing that uses the object information and map information.

The driving environment information 90 further includes vehicle state information detected by the vehicle state sensor.

Moreover, the control device 50 executes vehicle travel control that controls travel of the vehicle 1. The vehicle travel control includes steering control, acceleration control, and deceleration control. The control device 50 executes the vehicle travel control by controlling the travel device 40 (i.e., the steering device, the driving device, and the braking device).

Further, the control device 50 may execute automated driving control that controls automated driving of the vehicle 1. Here, the automated driving means that at least a part of steering, acceleration, and deceleration of the vehicle 1 is automatically performed independently of a driver's driving operation. The control device 50 generates a travel plan of the vehicle 1 based on the driving environment information 90. Examples of the travel plan include maintaining a current travel lane, making a lane change, making a right or left turn, avoiding collision with an object, and the like. Further, the control device 50 generates a target trajectory for achieving the travel plan. The target trajectory includes a target position and a target speed of the vehicle 1. Then, the control device 50 executes the above-described vehicle travel control so that the vehicle 1 follows the target trajectory.

1-3. Example of Vehicle Control System

Figure 5:
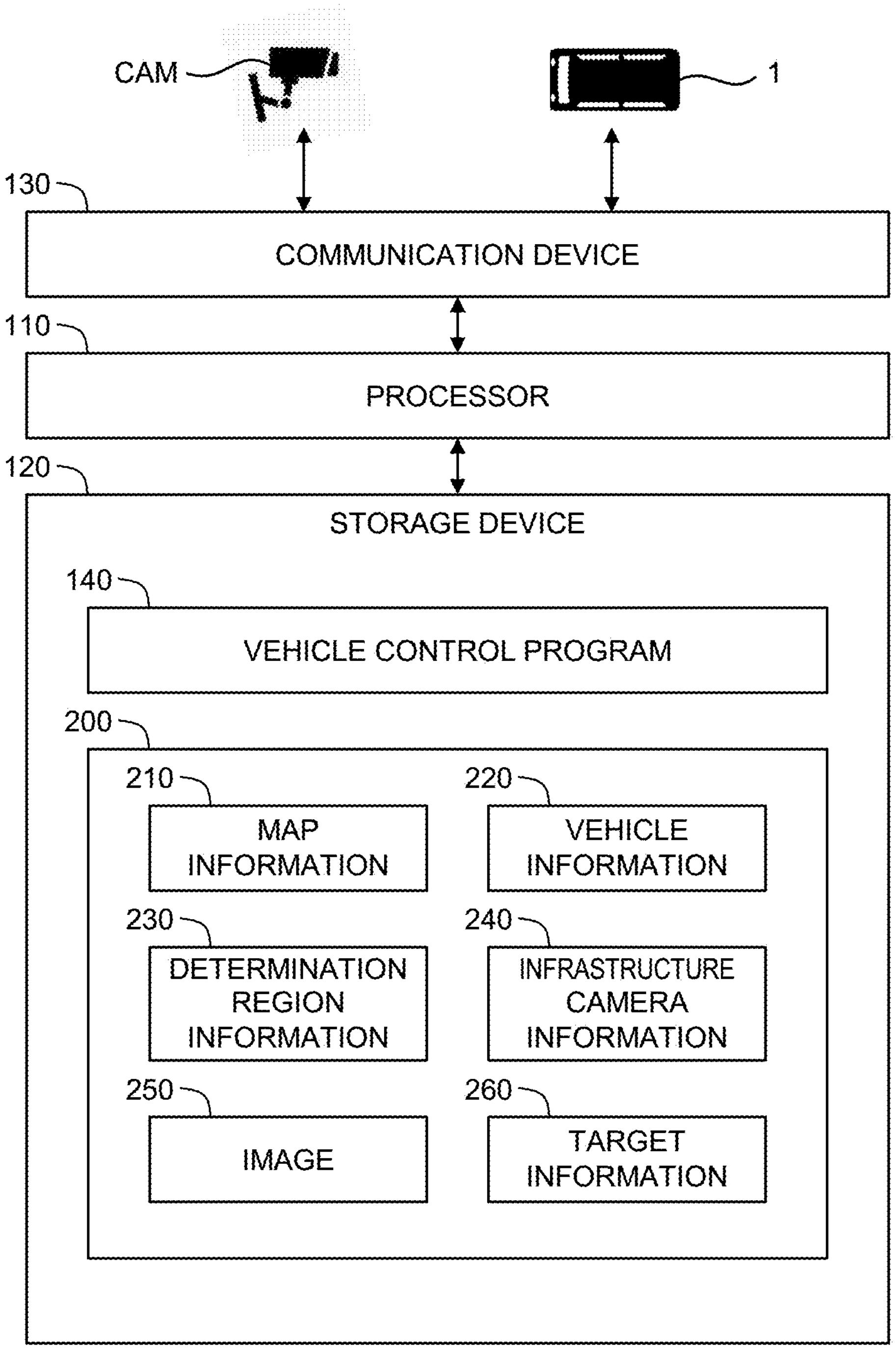
FIG. 5 is a block diagram showing an example of a configuration of the vehicle control system according to the first embodiment.

FIG. 5 is a block diagram showing an example of a configuration of the vehicle control system 100. The vehicle control system 100 includes one or more processors 110 (hereinafter, simply referred to as a processor 110 or processing circuitry), one or more storage devices 120 (hereinafter, simply referred to as a storage device 120), and a communication device 130. The processor 110 executes a variety of processing. Examples of the processor 110 include a CPU, a GPU, an ASIC, an FPGA, and the like. The storage device 120 stores a variety of information. Examples of the storage device 120 include an HDD, an SSD, a volatile memory, a non-volatile memory, and the like. The communication device 130 communicates with the outside via a communication network. For example, the communication device 130 communicates with the infrastructure camera CAM. The communication device 130 may communicate with the vehicle 1 (i.e., the in-vehicle system 10).

A vehicle control program 140 is a computer program for controlling the vehicle 1. The functions of the vehicle control system 100 may be implemented by a cooperation of the processor 110 executing the vehicle control program 140 and the storage device 120. The vehicle control program 140 is stored in the storage device 120. Alternatively, the vehicle control program 140 may be recorded on a non-transitory computer-readable recording medium.

The vehicle control system 100 may be partially the same as the in-vehicle system 10 described above. That is, the processor 60 and the processor 110 may be the same. The storage device 70 and the storage device 120 may be the same. The vehicle control program 80 and the vehicle control program 140 may be the same.

The processor 110 acquires a variety of information 200. The variety of information 200 is stored in the storage device 120. The variety of information 200 includes map information 210, vehicle information 220, determination region information 230, infrastructure camera information 240, the image 250, target information 260, and the like.

The map information 210 is map information of the predetermined area AR in which the vehicle 1 travels. The map information 210 is provided to the vehicle control system 100 in advance.

The vehicle information 220 is information related to the vehicle 1 being the control target. The vehicle information 220 includes at least the position information indicating the vehicle position PV (i.e., the current position of the vehicle 1) in the absolute coordinate system. The position information is obtained from the in-vehicle system 10. The vehicle information 220 may further include information on the direction of travel X of the vehicle 1. The direction of travel X of the vehicle 1 can be determined based on the vehicle position PV. The vehicle information 220 may further include speed information of the vehicle 1. The speed information is also obtained from the in-vehicle system 10.

The determination region information 230 is information regarding the determination region D used for the risk avoidance control. For example, the determination region information 230 includes a setting policy for setting the determination region D. The determination region information 230 may include a set value of the front distance Lf from the vehicle position PV to the front boundary DBf along the first direction S. The determination region information 230 may include a set value of the rear distance Lr from the vehicle position PV to the rear boundary DBr along the first direction S.

The infrastructure camera information 240 indicates the installation position, the installation direction, the angle of view, and the like for each infrastructure camera CAM. The infrastructure camera information 240 is provided to the vehicle control system 100 in advance.

The image 250, which is captured (taken) by the infrastructure camera CAM, indicates the situation of the predetermined area AR and its surroundings. The processor 110 acquires the image 250 from the infrastructure camera CAM via the communication device 130.

The target information 260 is information on the target TGT present in the predetermined area AR. The processor 110 detects the target TGT present in the predetermined area AR based on the image 250 captured by the infrastructure camera CAM. For example, the processor 110 recognizes the target TGT shown in the image 250 by using the image recognition AI. The processor 110 calculates the position of the target TGT in the absolute coordinate system based on the infrastructure camera information 240 and the in-image position of the target TGT in the image 250. Additionally, the target information 260 may include information on a target detected by the in-vehicle system 10.

It should be noted that the vehicle 1 being the control target and the other target TGT are distinguished from each other. For example, comparing the vehicle position PV with the position of the target TGT makes it possible to distinguish the vehicle 1 from the other targets TGT. For example, a target region covering the detected target TGT and the vicinity thereof is set. When the vehicle position PV is within the target region, the target TGT is regarded as the vehicle 1 being the control target.

The processor 110 controls the vehicle 1. When the vehicle control system 100 includes the in-vehicle system 10, the processor 110 controls the vehicle 1 by controlling the travel device 40. When the vehicle control system 100 is provided outside the in-vehicle system 10, the processor 110 remotely controls the vehicle 1 by issuing a control instruction to the in-vehicle system 10 via the communication device 130.

Figure 6:
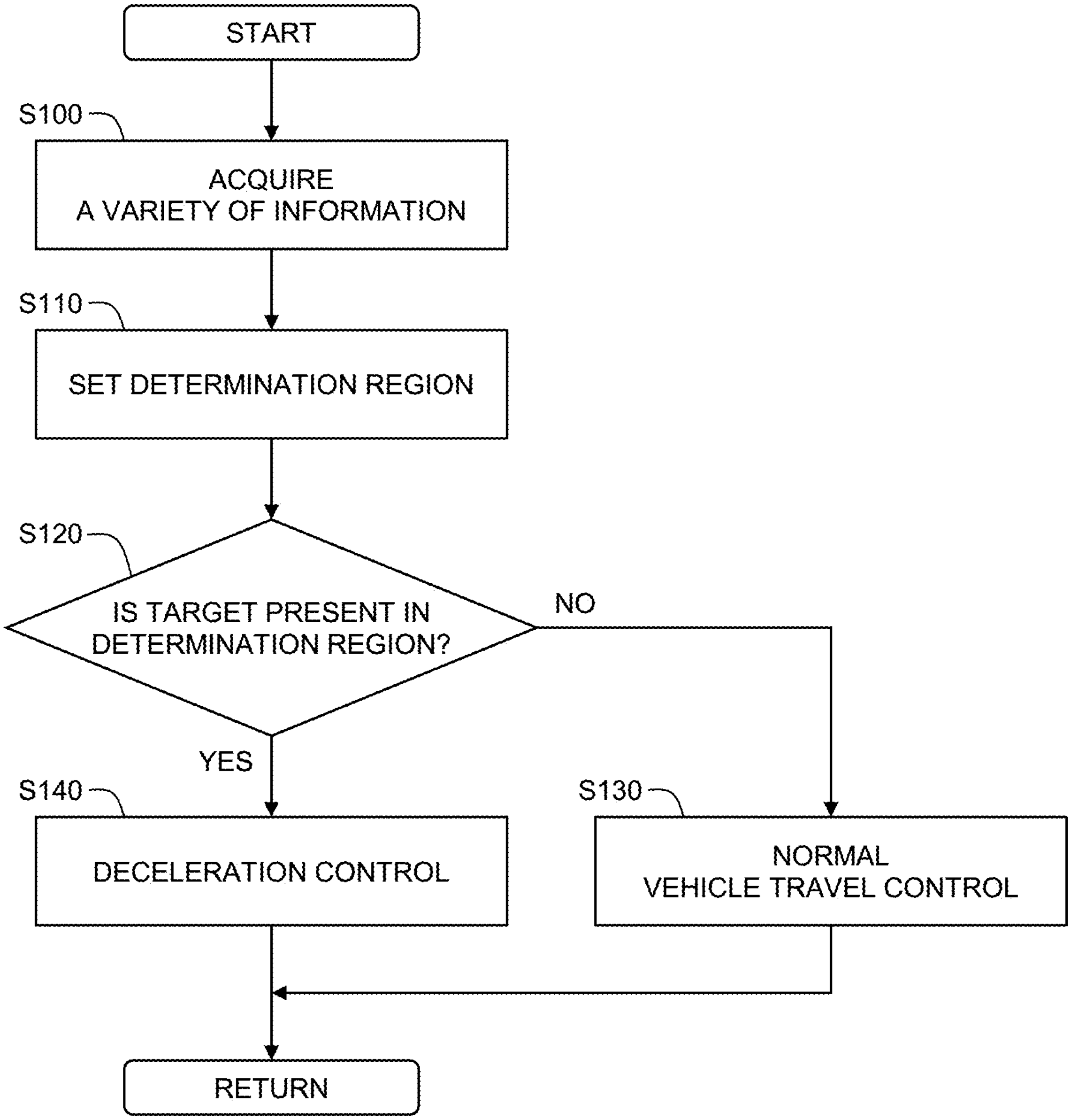
FIG. 6 is a flowchart summarizing processing related to the risk avoidance control according to the first embodiment.

In particular, the processor 110 performs the risk avoidance control in order to avoid a collision between the target TGT and the vehicle 1. FIG. 6 is a flowchart summarizing the processing related to the risk avoidance control.

In Step S100, the processor 110 acquires the variety of information 200.

In Step S110, the processor 110 sets the determination region D based on the map information 210, the vehicle information 220, and the determination region information 230. The processor 110 may set the front determination region Df and the rear determination region Dr in consideration of the direction of travel X of the vehicle 1.

In Step S120, the processor 110 determines whether or not the target TGT is present in the determination region D on the basis of the target information 260 and the determination region D. For example, the processor 110 sets a target region that covers the detected target TGT and the vicinity thereof. For example, the target region has a circular shape. As a size of the target TGT becomes larger, the target region also becomes larger. The target region may become larger as a moving speed of the target TGT becomes higher. The target region may have a shape in which a direction of movement of the target TGT is widened. When the target region and the determination region D at least partially overlap each other, the processor 110 determines that the target TGT is present in the determination region D.

In a case where the target TGT is not present in the determination region D (Step S120; No), the processing proceeds to Step S130. In Step S130, the processor 110 executes normal vehicle travel control.

On the other hand, in a case where the target TGT is present in the determination region D (Step 120; Yes), the processing proceeds to Step S140. In Step S140, the processor 110 performs deceleration control for decelerating the vehicle 1. The processor 110 may decelerate to stop the vehicle 1.

1-4. Effects

As described above, according to the present embodiment, the infrastructure camera CAM is used for controlling the vehicle 1. Using the infrastructure camera CAM makes it possible to detect the target TGT that cannot be detected by the in-vehicle sensor such as the in-vehicle camera. For example, even a target TGT present ahead of a curve in front of the vehicle 1 can be detected by the infrastructure camera CAM. Then, the control of the vehicle 1 is performed in consideration of the target TGT that cannot be detected by the in-vehicle sensor. More specifically, when the target TGT is present in the determination region D around the vehicle 1, the vehicle 1 is decelerated. Since the target TGT that cannot be detected by the in-vehicle sensor is taken into consideration as well, it is possible to decelerate the vehicle 1 well in advance, which can reduce necessity of sudden braking. Therefore, the safety in controlling the vehicle 1 is improved.

Other embodiments will be described below. The configurations of the in-vehicle system 10 and the vehicle control system 100 are the same as those in the first embodiment.

2. SECOND EMBODIMENT

Figure 7:
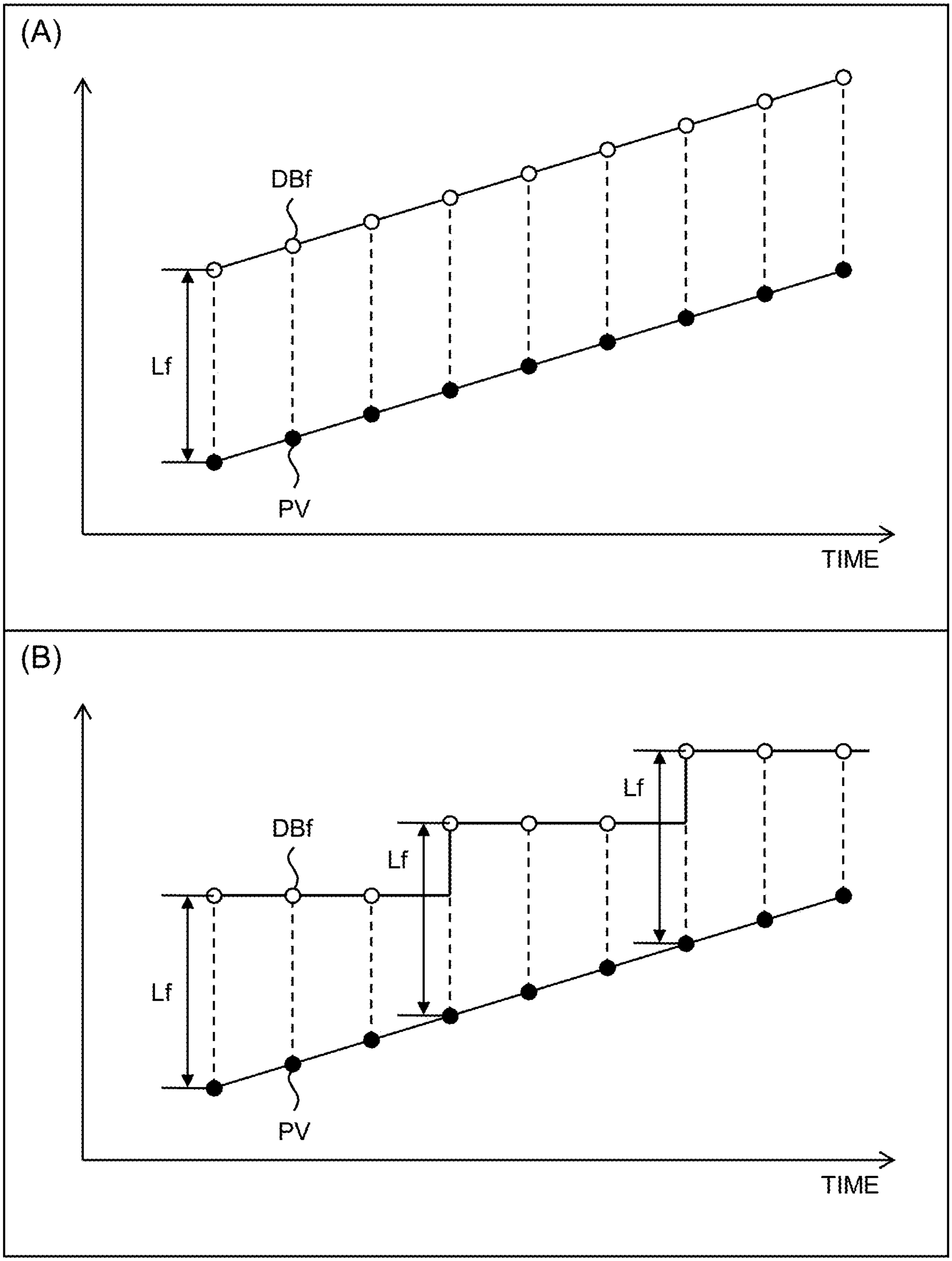
FIG. 7 is a diagram for explaining a method of updating a front boundary of a front determination region according to a second embodiment.

FIG. 7 shows an example of updating the front boundary DBf of the front determination region Df. A horizontal axis represents time, and a vertical axis represents the vehicle position PV and the front boundary DBf. The front determination region Df is a region between the vehicle position PV and the front boundary DBf. The front distance Lf between the vehicle position PV and the front boundary DBf is set to a distance within which the vehicle 1 is able to stop easily without sudden braking.

According to pattern (A) shown in FIG. 7, the front boundary DBf is updated every time the vehicle position PV is updated. That is to say, an update frequency of the front boundary DBf is the same as an update frequency (sampling frequency) of the vehicle position PV. It can also be said that the front boundary DBf changes in complete conjunction with the vehicle position PV. However, when the update frequency of the front boundary DBf becomes higher, processing load on the processor 110 also increases. Increasing the update frequency of the front boundary DBf more than necessary may not preferable from a viewpoint of the processing load.

In view of the above, according to the second embodiment, as shown in Pattern (B) in FIG. 7, the update frequency of the front boundary DBf of the front determination region Df is set to be lower than the update frequency of the vehicle position PV. That is, the processor 110 updates the front boundary DBf of the front determination region Df at a frequency lower than the update frequency of the vehicle position PV (that is, the vehicle information 220). This makes it possible to reduce the processing load on the processor 110.

The processor 110 may decrease the update frequency of the front boundary DBf as the speed of the vehicle 1 becomes lower. The speed of the vehicle 1 is obtained from the vehicle information 220. The update frequency of the front boundary DBf may decrease monotonically or stepwise in accordance with the speed of the vehicle 1. For example, the update frequency when the speed of the vehicle 1 is equal to or higher than a predetermined threshold is a first update frequency, and the update frequency when the speed of the vehicle 1 is lower than the predetermined threshold is a second update frequency lower than the first update frequency. Changing the update frequency of the front boundary DBf in consideration of the speed of the vehicle 1 makes it possible to more effectively reduce the processing load on the processor 110.

Figure 8:
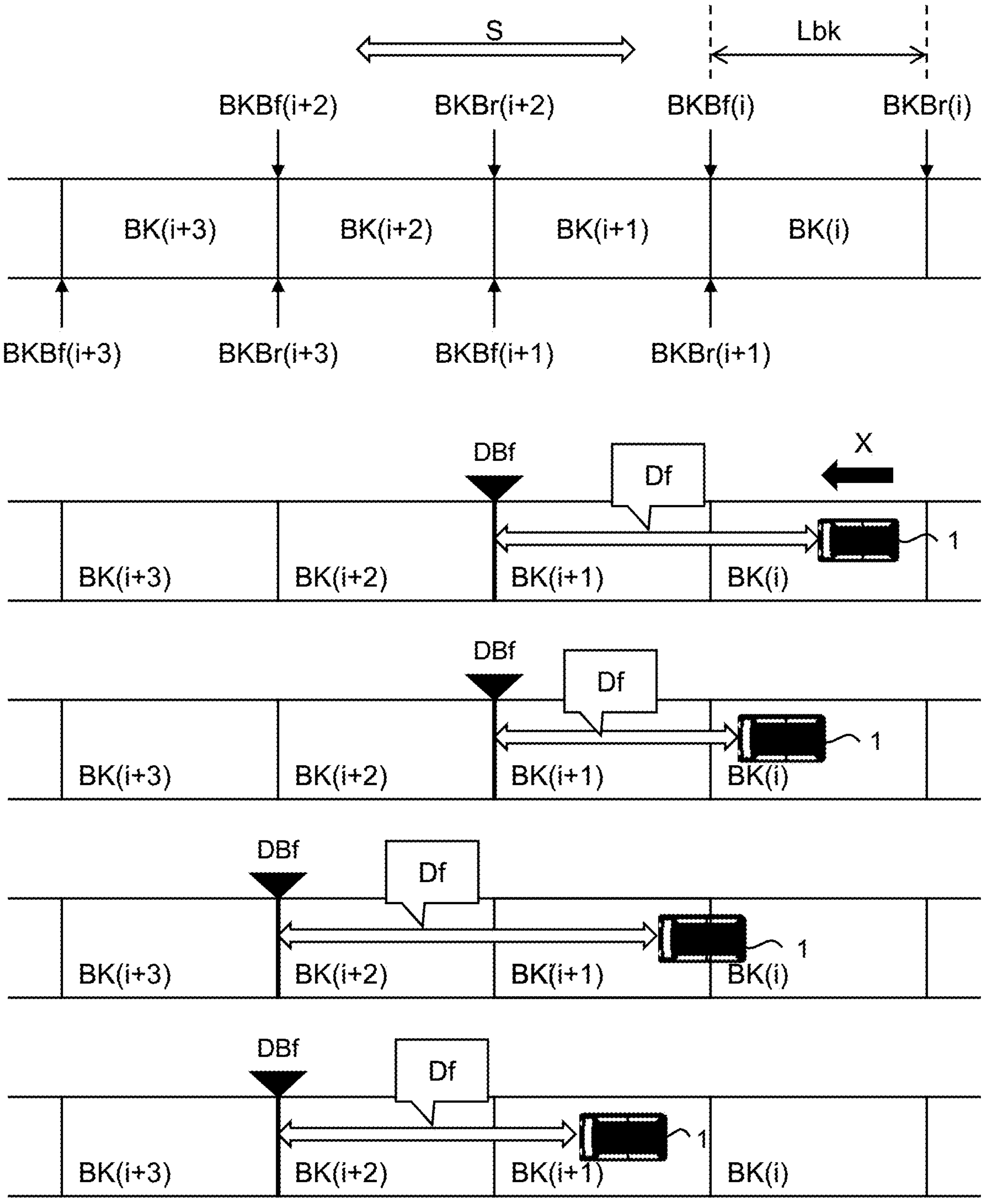
FIG. 8 is a diagram for explaining an example of updating of the front boundary of the front determination region according to the second embodiment.

FIG. 8 is a diagram for explaining an example of updating the front boundary DBf of the front determination region Df. The predetermined area AR in which the vehicle 1 travels is divided into a plurality of blocks BK along the first direction S. Each block BK is a region between a front block boundary BKBf and a rear block boundary BKBr. The front block boundary BKBf is located in the direction of travel X of the vehicle 1 when viewed from the rear block boundary BKBr. A block length Lbk is a length of the block BK along the first direction S. That is, the block length Lbk of the block BK is a length between the front block boundary BKBf and the rear block boundary BKBr along the first direction S. The block length Lbk is set to a distance within which the vehicle 1 is able to stop easily without sudden braking.

Block arrangement information indicates an arrangement of a plurality of blocks BK in the absolute coordinate system. That is, the block arrangement information indicates positions of the front block boundary BKBf and the rear block boundary BKBr of each block BK in the absolute coordinate system. Such the block arrangement information is registered in the map information 210 in advance.

The processor 110 sets and updates the front boundary DBf of the front determination region Df based on the vehicle position PV and the block arrangement information. For the sake of description, a block BK in which the vehicle 1 is currently present is hereinafter referred to as a "first block BK1." A block BK adjacent to and in front of the first block BK1 is hereinafter referred to as a "second block BK2." That is, the second block BK2 is located in the direction of travel X of the vehicle 1 when viewed from the first block BK1. The processor 110 recognizes the first block BK1 and the second block BK2 based on the vehicle position PV and the block arrangement information. Then, the processor 110 sets the front block boundary BKBf of the second block BK2 as the front boundary DBf of the front determination region Df.

In the example shown in FIG. 8, the vehicle 1 is initially present in the block BK (i). That is, the first block BK1 is the block BK (i), and the second block BK2 is the block BK (i+1). At this time, the front boundary DBf of the front determination region Df is the front block boundary BKBf (i+1) of the block BK (i+1). While the vehicle 1 is traveling in the block BK (i), the front boundary DBf is maintained without being updated.

The vehicle 1 eventually reaches the front block boundary BKBf (i) of the block BK (i). The processor 110 determines whether or not a predetermined portion of the vehicle 1 has passed the front block boundary BKBf (i) of the block BK (i) based on the vehicle position PV and the block arrangement information. The predetermined portion is arbitrary. When the predetermined portion of the vehicle 1 passes the front block boundary BKBf (i) of the block BK (i), the processor 110 determines that the vehicle 1 passes the front block boundary BKBf (i) and enters the adjacent block BK (i+1).

When the vehicle 1 enters the block BK (i+1), the block BK (i+1) becomes a new first block BK1, and the block BK (i+2) becomes a new second block BK2. That is, the first block BK1 and the second block BK2 are updated. Therefore, the processor 110 sets the front block boundary BKBf (i+2) of the block BK (i+2) as a new front boundary DBf. That is, the front boundary DBf of the front determination region Df is updated.

Thereafter, the same processing is repeated. Each time the vehicle 1 passes the front block boundary BKBf of the first block BK1, the processor 110 updates the first block BK1, the second block BK2, and the front boundary DBf of the front determination region Df. Such the method makes it possible to set the update frequency of the front boundary DBf of the front determination region Df to be lower than the update frequency of the vehicle position PV.

Figure 9:
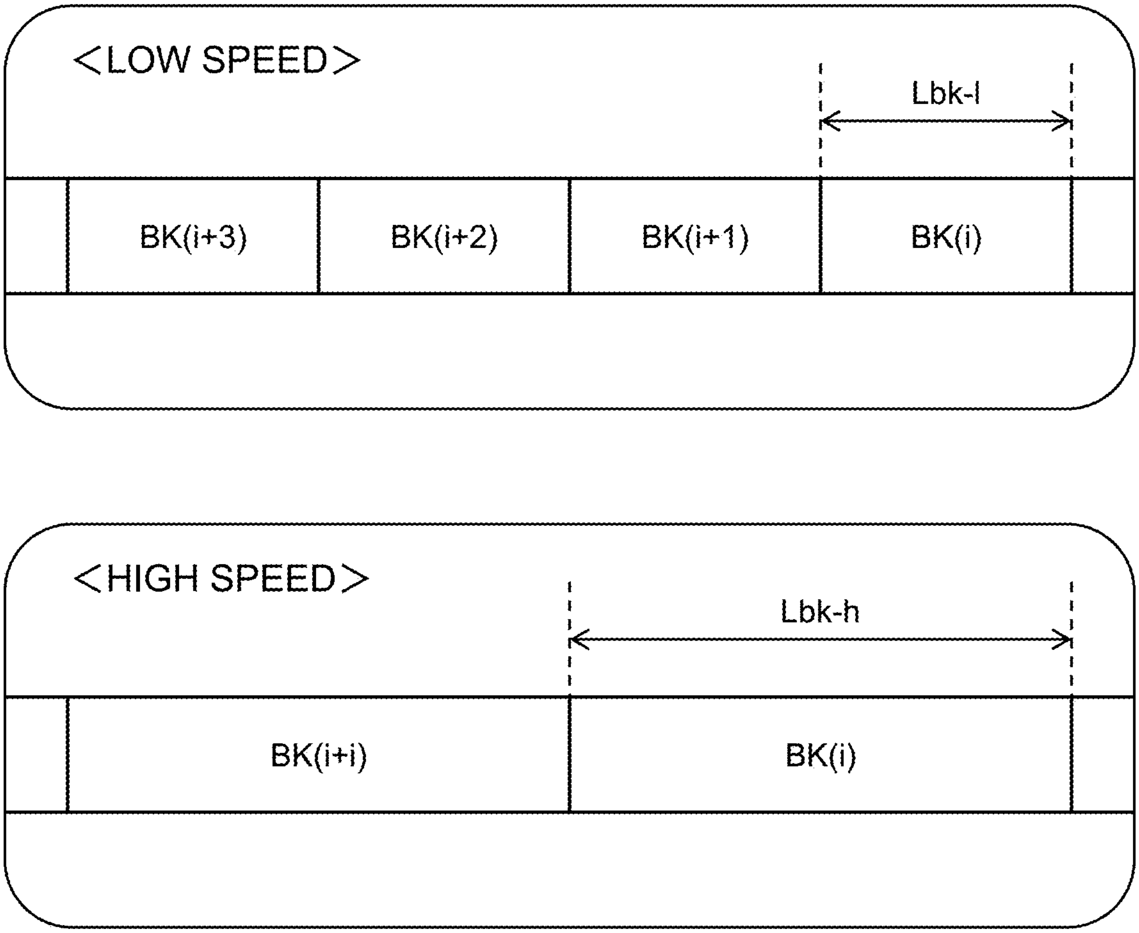
FIG. 9 is a diagram for explaining an example of block setting according to a vehicle speed according to the second embodiment.

As shown in FIG. 9, the block length Lbk of each block BK may become longer as the speed of the vehicle 1 becomes higher. The block length Lbk may change monotonically or stepwise in accordance with the speed of the vehicle 1. In the example shown in FIG. 9, the block length Lbk in a case where the speed of the vehicle 1 is less than a predetermined threshold is a first block length Lbk-1. The block length Lbk in a case where the speed of the vehicle 1 is equal to or higher than the predetermined threshold is a second block length Lbk-h that is longer than the first block length Lbk-1. The block arrangement information for each case of the first block length Lbk-1 and the second block length Lbk-h is registered in the map information 210. The speed of the vehicle 1 is obtained from the vehicle information 220. The processor 110 acquires the block arrangement information corresponding to the speed of the vehicle 1.

Effects

As described above, according to the second embodiment, the update frequency of the front boundary DBf of the front determination region Df is set to be lower than the update frequency of the vehicle position PV. This makes it possible to reduce the processing load on the processor 110. In particular, when a large number of vehicles 1 are controlled simultaneously in parallel based on the images 250 captured by a large number of infrastructure cameras CAM, it is preferable to reduce the processing load.

As shown in FIG. 8, the front boundary DBf of the front determination region Df may be set and updated based on the block BK. This makes it possible to reduce the update frequency of the front boundary DBf and thus to reduce the processing load. In addition, in the case where the preset blocks BK are used, the processor 110 does not need to draw the front boundary DBf in consideration of a road shape every moment. This also contributes to the reduction of the processing load. Further, the front boundary DBf is prevented from becoming an unnatural line.

3. THIRD EMBODIMENT

Figure 10:
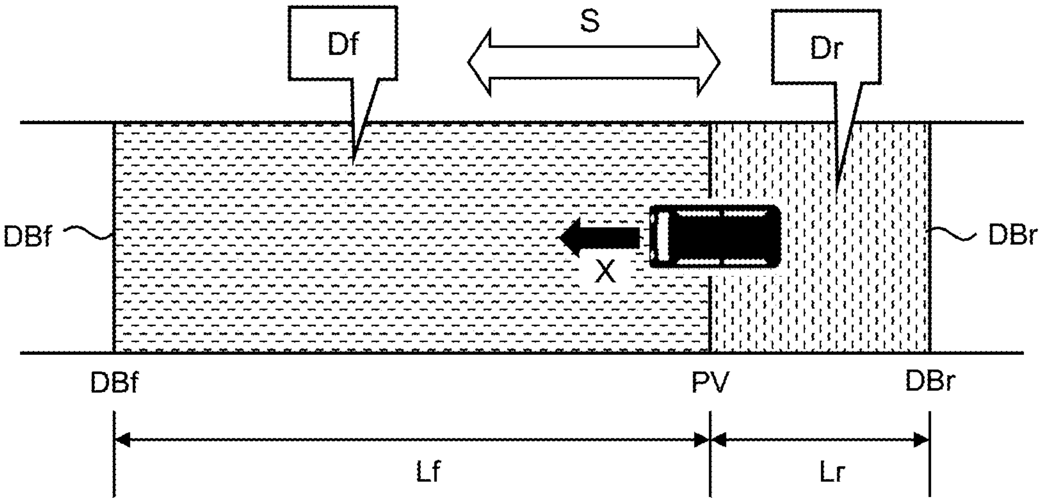
FIG. 10 is a conceptual diagram for explaining a front determination region and a rear determination region according to a third embodiment.

FIG. 10 is a conceptual diagram for explaining the front determination region Df and the rear determination region Dr according to the third embodiment. The front determination region Df is a region through which the vehicle 1 will pass in the near future. On the other hand, the rear determination region Dr is a region through which the vehicle 1 has already passed. Even if the target TGT is present in the rear determination region Dr, the risk of the target TGT is relatively low. If the rear determination region Dr is set to be unnecessarily wide, the deceleration control may be activated even though the target TGT is far away from the vehicle 1. Excessive deceleration control may deteriorate continuity of travel and cause a user of the vehicle 1 to feel a sense of discomfort.

In view of the above, according to the third embodiment, the rear determination region Dr is set to be narrower than the front determination region Df. More specifically, the processor 110 sets the front determination region Df and the rear determination region Dr such that the rear distance Lr is shorter than the front distance Lf (Lf>Lr). The front distance Lf and the rear distance Lr may be predetermined values, respectively.

According to the third embodiment, it is possible to suppress excessive activation of the deceleration control while ensuring the safety. As a result, the continuity of travel is secured. Further, the user of the vehicle 1 is prevented from feeling a sense of discomfort.

4. FOURTH EMBODIMENT

A combination of the second embodiment and the third embodiment described above also is possible. In this case, the update frequency of the front boundary DBf of the front determination region Df is set to be lower than the update frequency of the vehicle position PV. In addition, the rear determination region Dr is set to be narrower than the front determination region Df. As a result, both effects of reducing the processing load and suppressing the excessive activation of the deceleration control can be achieved.

5. FIFTH EMBODIMENT

In the fifth embodiment, an update frequency of the rear boundary DBr of the rear determination region Dr is set to be lower than the update frequency of the vehicle position PV. A description overlapping with the above-described second embodiment will be omitted as appropriate.

Figure 11:
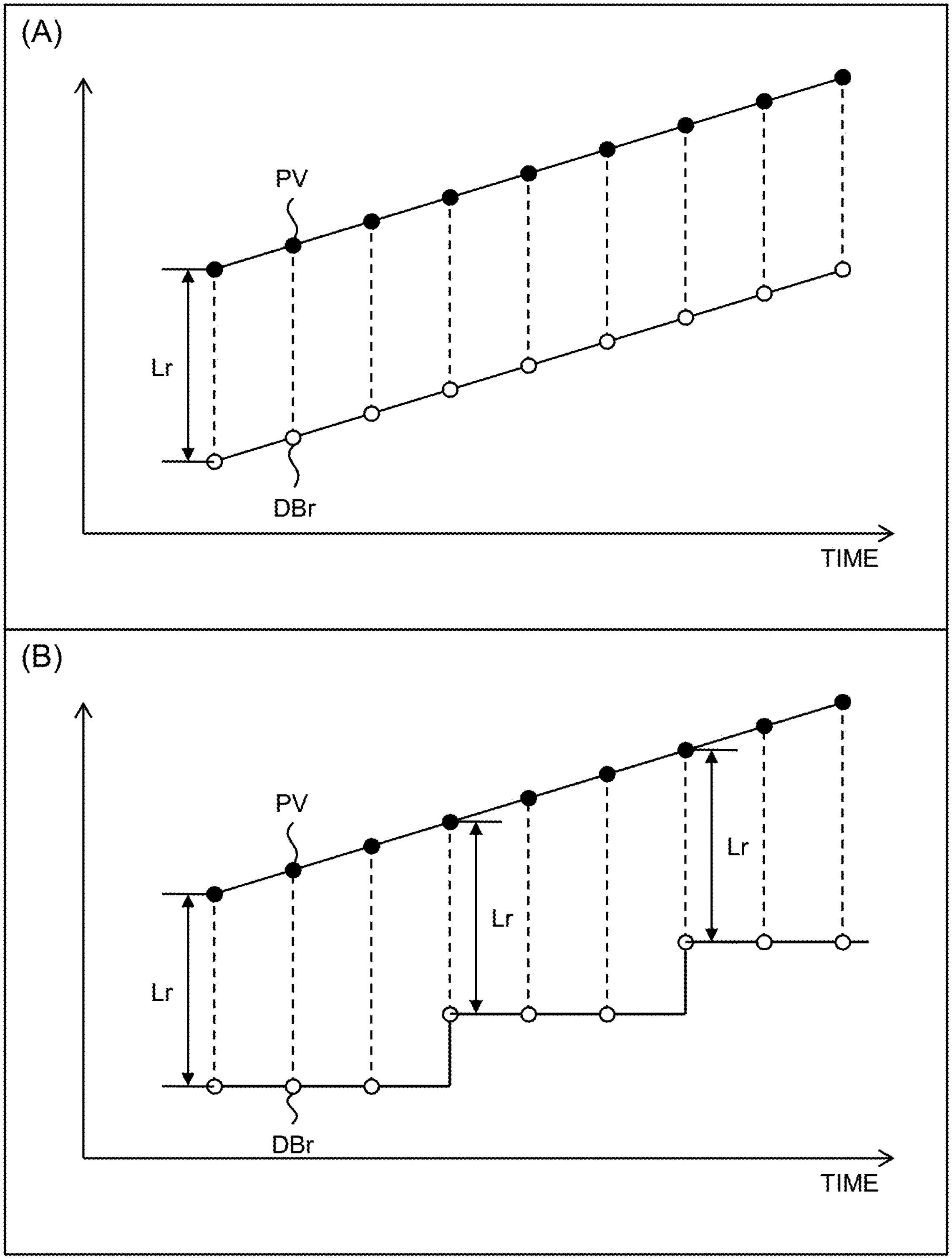
FIG. 11 is a diagram for explaining a method of updating the rear determination region according to a fifth embodiment.

FIG. 11 shows an example of updating the rear boundary DBr of the rear determination region Dr. According to Pattern (A), the rear boundary DBr is updated every time the vehicle position PV is updated. That is, the update frequency of the rear boundary DBr is the same as the update frequency (sampling frequency) of the vehicle position PV. In this case, the processing load increases. On the other hand, according to Pattern (B), the update frequency of the rear boundary DBr is lower than the update frequency of the vehicle position PV. Therefore, the processing load on the processor 110 is reduced.

The processor 110 may decrease the update frequency of the rear boundary DBr as the speed of the vehicle 1 becomes lower. This makes it possible to reduce the processing load more effectively.

Figure 12:
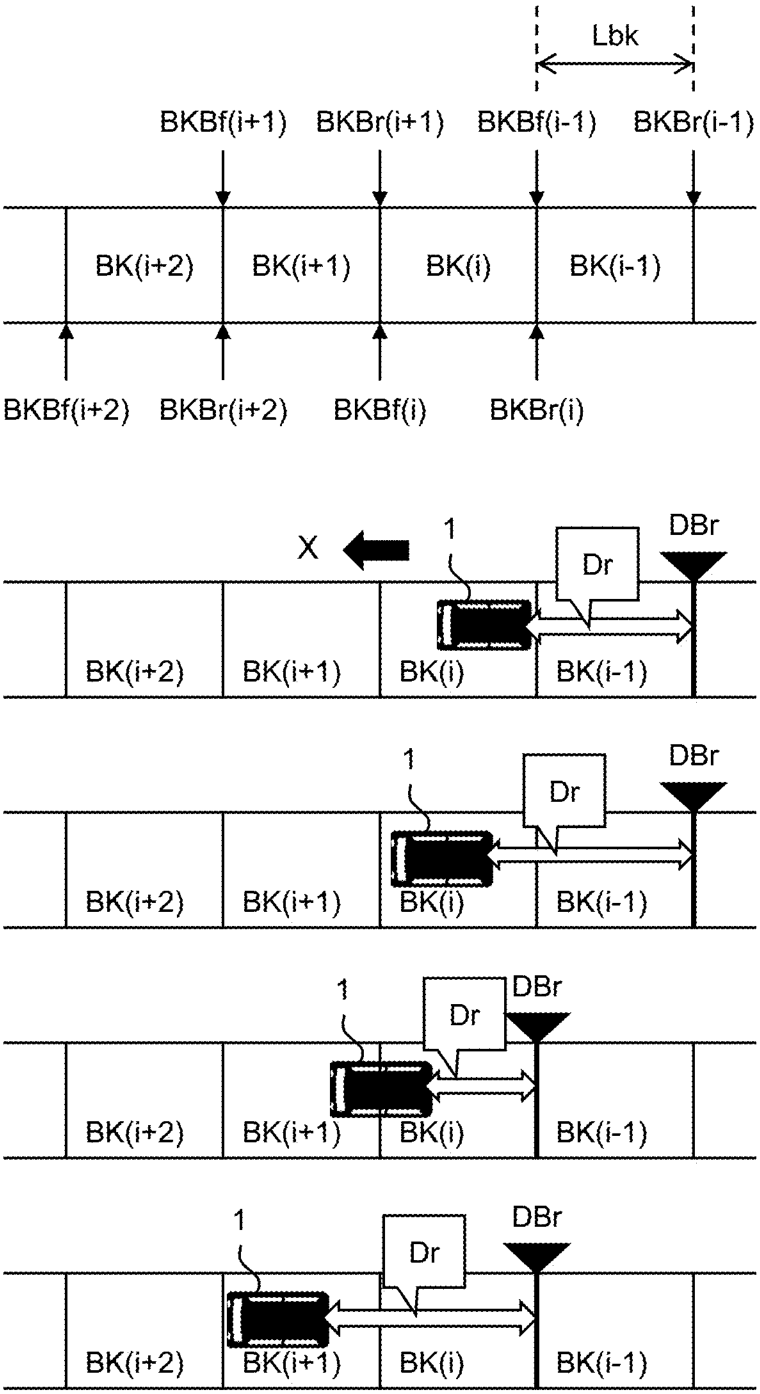
FIG. 12 is a diagram for explaining an example of updating of the rear determination region according to the fifth embodiment.

FIG. 12 is a diagram for explaining an example of updating the rear boundary DBr of the rear determination region Dr. A first block BK1 is a block BK in which the vehicle 1 is currently present. A second block BK2 is a block BK adjacent to and behind the first block BK1. That is, the second block BK2 is located in the direction opposite to the direction of travel X of the vehicle 1 when viewed from the first block BK1. The processor 110 recognizes the first block BK1 and the second block BK2 based on the vehicle position PV and the block arrangement information. Then, the processor 110 sets the rear block boundary BKBr of the second block BK2 as the rear boundary DBr of the rear determination region Dr. Each time the vehicle 1 passes the front block boundary BKBf of the first block BK1, the processor 110 updates the first block BK1, the second block BK2, and the rear boundary DBr of the rear determination region Dr. Such a method makes it possible to set the update frequency of the rear boundary DBr of the rear determination region Dr to be lower than the update frequency of the vehicle position PV.

According to the fifth embodiment, it is possible to reduce the processing load on the processor 110. In particular, when a large number of vehicles 1 are controlled simultaneously in parallel based on the images 250 captured by a large number of infrastructure cameras CAM, it is preferable to reduce the processing load.

A combination of the fifth embodiment and any of the above-described embodiments also is possible.

Figure 13:
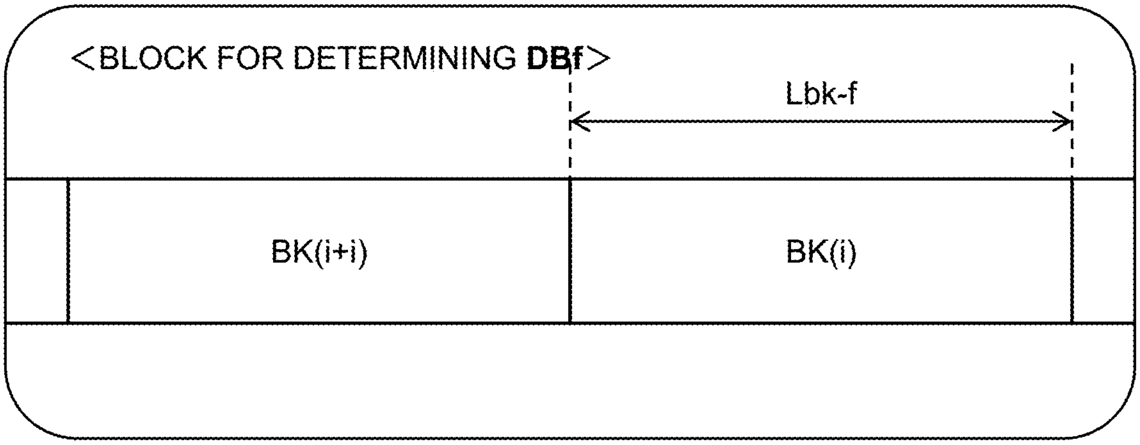
FIG. 13 is a diagram for explaining an example of block setting according to the fifth embodiment.
Figure 13:
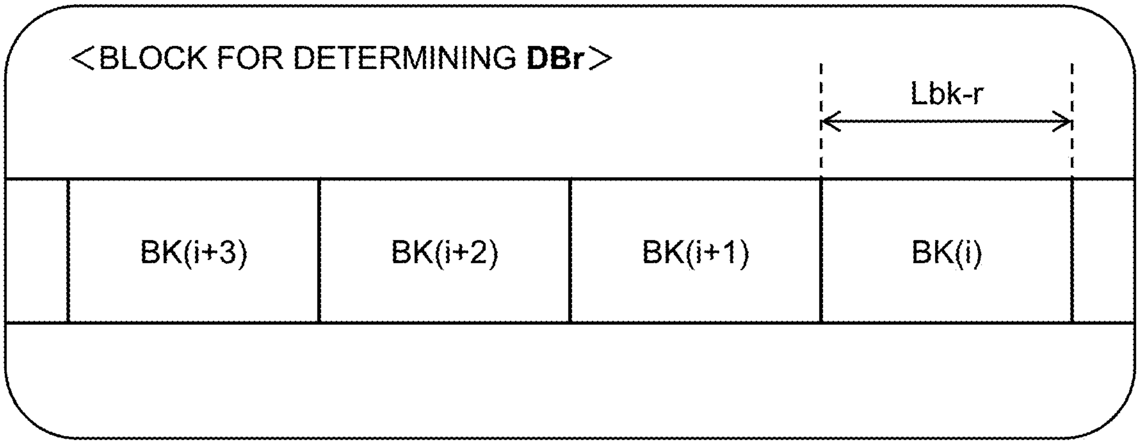

FIG. 13 is a diagram for explaining a combination of the fifth embodiment and the fourth embodiment. When the front boundary DBf of the front determination region Df is set, the block BK having a block length Lbk-f is used. On the other hand, when the rear boundary DBr of the rear determination region Dr is set, the block BK having a block length Lbk-r is used. The block length Lbk-r is shorter than the block length Lbk-f. As a result, the rear distance Lr becomes shorter than the front distance Lf. Thus, both effects of reducing the processing load and suppressing the excessive activation of the deceleration control can be obtained.

What is claimed is:

1. A vehicle control system for controlling a vehicle traveling in a predetermined area, the vehicle control system comprising processing circuitry configured to:

acquire vehicle information indicating a position of the vehicle;

set a determination region around the vehicle based on the vehicle information;

acquire an image captured by an infrastructure camera that is installed outside the vehicle and images a situation of the predetermined area;

determine whether or not a target is present in the determination region based on the image captured by the infrastructure camera;
decelerate the vehicle when the target is present in the determination region;
set a front determination region that is the determination region in front of the vehicle based on the vehicle information; and
update a front end of the front determination region at a frequency lower than an update frequency of the vehicle information.

2. The vehicle control system according to claim 1, wherein
the vehicle information further indicates a direction of travel of the vehicle.

3. The vehicle control system according to claim 2, wherein
the predetermined area extends in a first direction and is divided into a plurality of blocks along the first direction,
each of the plurality of blocks is a region between a front block boundary and a rear block boundary,
the front block boundary is located in the direction of travel of the vehicle when viewed from the rear block boundary,
the plurality of blocks include a first block in which the vehicle is present and a second block located in the direction of travel of the vehicle when viewed from the first block, and
the processing circuitry is further configured to:
recognize the first block and the second block based on the vehicle information;
set the front block boundary of the second block as the front end of the front determination region, and
update the first block, the second block, and the front end of the front determination region each time the vehicle passes the front block boundary of the first block.

4. The vehicle control system according to claim 3, wherein
a block length is a length of each of the plurality of blocks along the first direction, and
the block length becomes longer as a speed of the vehicle becomes higher.

5. The vehicle control system according to claim 1, wherein
the processing circuitry is further configured to decrease an update frequency of the front end of the front determination region as a speed of the vehicle becomes lower.

6. The vehicle control system according to claim 1, wherein
the vehicle information further indicates a direction of travel of the vehicle, and
the processing circuitry is further configured to set the front determination region and a rear determination region that is the determination region behind the vehicle, based on the vehicle information.

7. The vehicle control system according to claim 6, wherein
a front distance is a distance from the position of the vehicle to a front end of the front determination region,
a rear distance is a distance from the position of the vehicle to a rear end of the rear determination region, and
the processing circuitry is further configured to set the front determination region and the rear determination region such that the rear distance is shorter than the front distance.

8. The vehicle control system according to claim 7, wherein
the rear distance is a predetermined distance.

9. The vehicle control system according to claim 6, wherein
the processing circuitry is further configured to update a rear end of the rear determination region at a frequency lower than an update frequency of the vehicle information.

10. The vehicle control system according to claim 1, wherein
the determination region includes a first determination region and a second determination region surrounding the first determination region, and
the processing circuitry is further configured to:
execute stop control that decelerates to stop the vehicle, when the target is present in the first determination region; and
decelerate the vehicle more slowly than in a case of the stop control, when the target is present in the second determination region.

11. The vehicle control system according to claim 1, wherein the processing circuitry is further configured to:
calculate a position of the target in an absolute coordinate system based on installation information of the infrastructure camera and an in-image position of the target in the image captured by the infrastructure camera; and
determine whether or not the target is present in the determination region based on the position of the target in the absolute coordinate system and the position of the vehicle in the absolute coordinate system.

12. The vehicle control system according to claim 1, wherein the processing circuitry is further configured to recognize the target in the image captured by the infrastructure camera by using an image recognition AI generated through machine learning.

13. The vehicle control system according to claim 1, wherein the processing circuitry is further configured to:
set a target region that covers the target and a vicinity of the target; and
determine that the target is present in the determination region when the target region and the determination region at least partially overlap each other.

14. The vehicle control system according to claim 13, wherein the target region becomes larger as a moving speed of the target becomes higher.

15. The vehicle control system according to claim 1, wherein the predetermined area is an elongated region extending in a first direction, and the determination region is set so as to extend in the first direction.

16. The vehicle control system according to claim 1, wherein the vehicle is an automated driving vehicle, and the processing circuitry is further configured to control automated driving of the vehicle based on the image captured by the infrastructure camera.

17. The vehicle control system according to claim 1, wherein the processing circuit is further configured to acquire image from a plurality of infrastructure cameras along a longitudinal direction of the predetermined area, wherein respective angles of view of the plurality of infrastructure cameras partially overlap each other.

18. A vehicle control method for controlling a vehicle in a predetermined area by a computer, the vehicle control method comprising:

acquiring vehicle information indicating a position of the vehicle;

setting a determination region around the vehicle based on the vehicle information;

acquiring an image captured by an infrastructure camera that is installed outside the vehicle and images a situation of the predetermined area;

determining whether or not a target is present in the determination region based on the image captured by the infrastructure camera;

decelerating the vehicle when the target is present in the determination region;

setting a front determination region that is the determination region in front of the vehicle based on the vehicle information; and updating a front end of the front determination region at a frequency lower than an update frequency of the vehicle information.

* * * * *